May 19, 1931.  T. H. THOMAS  1,805,646
BRAKE PIPE CUT-OFF VALVE
Filed Sept. 7, 1928  3 Sheets-Sheet 1
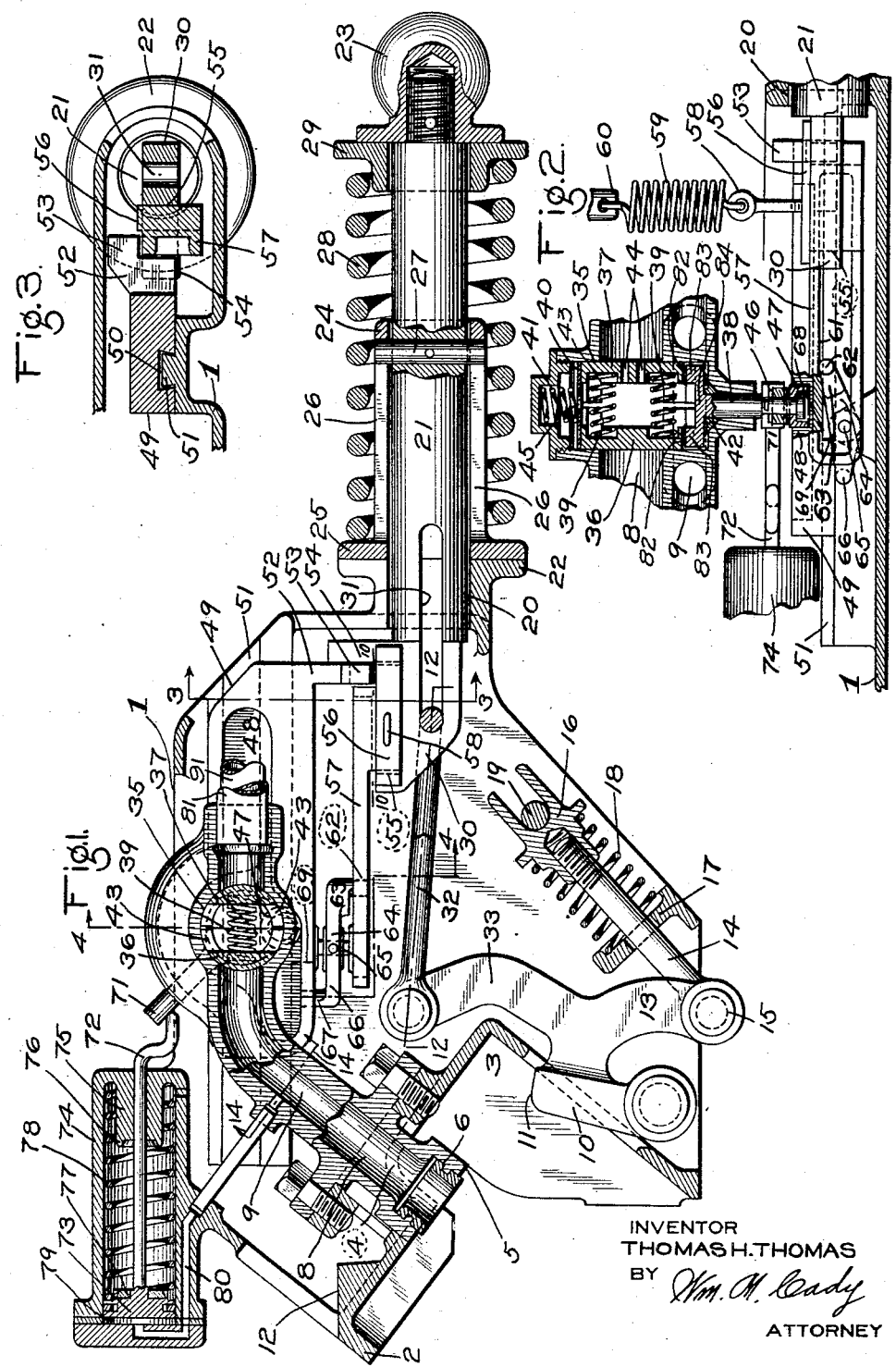
INVENTOR
THOMAS H. THOMAS
BY
Wm. M. Cady
ATTORNEY May 19, 1931. T. H. THOMAS 1,805,646
BRAKE-PIPE CUT-OFF VALVE
Filed Sept. 7, 1928 3 Sheets-Sheet 2
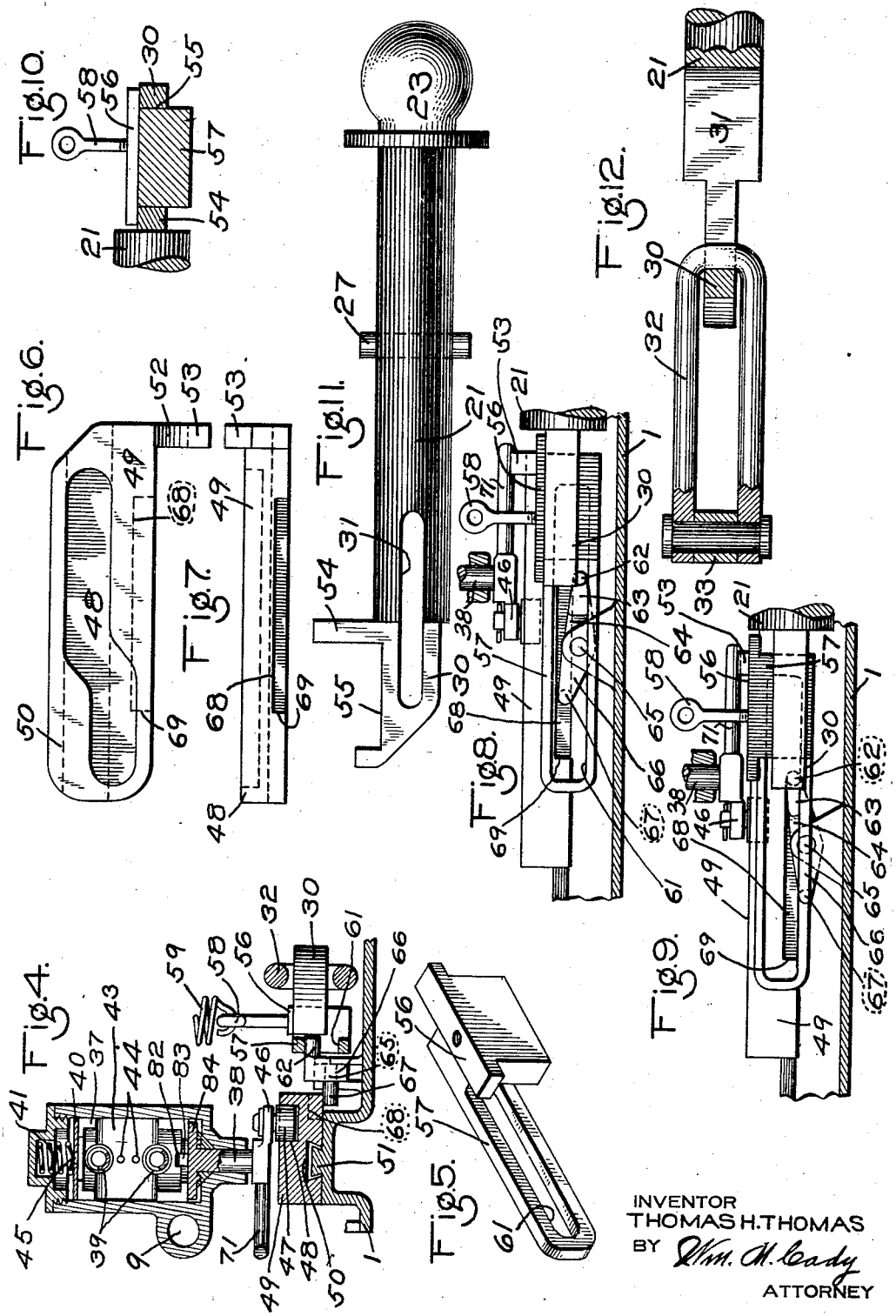
INVENTOR
THOMAS H. THOMAS
BY Wm. M. Cady
ATTORNEY May 19, 1931. T. H. THOMAS 1,805,646
BRAKE PIPE CUT-OFF VALVE
Filed Sept. 7, 1928 3 Sheets-Sheet 3
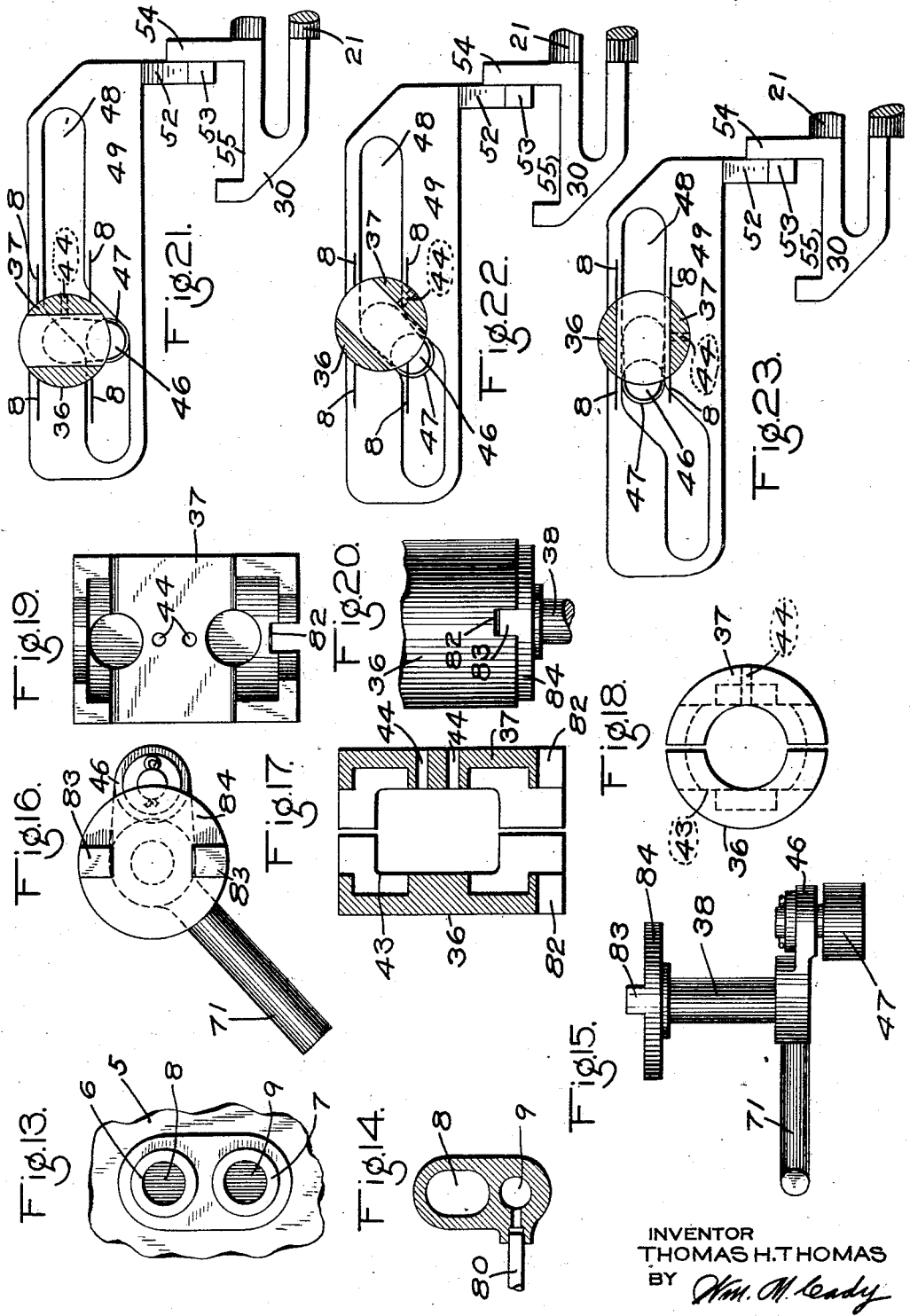
INVENTOR
THOMAS H. THOMAS
BY Wm. M. Cady
ATTORNEY Patented May 19, 1931

1,805,646

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE PIPE CUT-OFF VALVE

Application filed September 7, 1928. Serial No. 304,607.

This invention relates to automatic train pipe couplings, and more particularly to the type known as the tight or rigid lock coupling.

An object of the invention is to provide a train pipe coupling of the above mentioned type with means for automatically controlling the flow of fluid from a charged train pipe section to an uncharged section during the coupling operation.

Another object of the invention is to provide a train pipe coupling of the above mentioned type with means by which the charging of an empty section of train pipe from a charged section is controlled so as not to produce an emergency application by a too rapid drop in brake pipe pressure in the charged section.

Another object of the invention is to provide a train pipe coupling of the above mentioned type with means by which the flow of fluid through a coupled train pipe is governed by the amount of pressure of the fluid in a parallel train pipe.

The invention also comprises certain new and useful improvements in the construction, arrangement and combination of the several parts of which it is composed, as will be hereinafter more fully described and claimed.

In the accompanying drawings, Figure 1 is a longitudinal section of an automatic train pipe coupling embodying my invention, showing the same in uncoupled position; Fig. 2 is a side elevation, partly in section of a portion of the structure shown in Fig. 1; Fig. 3 is a transverse section taken along the line 3—3 of Fig. 1; Fig. 4 is a vertical transverse section taken approximately on the line 4—4 of Fig. 1; Fig. 5 is a detail perspective of the latch-operating member; Fig. 6 is a detail plan of the valve actuating bar; Fig. 7 is a side elevation of the bar shown in Fig. 6, illustrating the notch in the side wall thereof; Fig. 8 is a view of a portion of the structure shown in Fig. 2, illustrating the relative position of the latch member when the coupling head is coupled to a counterpart coupling; Fig. 9 is a view similar to Fig. 8 showing the latch-operating member elevated; Fig. 10 is a detail section taken on the line 10—10 of Fig. 1; Fig. 11 is a detail plan of the coupling stem; Fig. 12 is a detail vertical longitudinal section taken on the line 12—12 of Fig. 1 showing the connection between the latch lever and the coupling stem; Fig. 13 is a detail view of a portion of the forward or nose end of the coupling head showing the ends of the train pipe conduits; Fig. 14 is a section taken on the line 14—14 of Fig. 1; Fig. 15 is a detail side elevation of the plug valve operating rod; Fig. 16 is a plan of the plug valve operating rod; Fig. 17 is a vertical transverse section of the plug valve segments; Fig. 18 is a plan thereof; Fig. 19 is an elevation of one of the plug valve segments, looking toward the interior thereof; Fig. 20 is a detail elevation showing one of the plug valve segments mounted on the operating rod; and Figs. 21 to 23 inclusive are diagrammatic views illustrating the manner of operating the plug valve.

Train pipe couplings of the type known as the tight or rigid lock coupling, are shown for example in the Westinghouse Patent No. 708,747, dated September 9, 1902, and in which each coupling head is provided with a laterally projecting hook-shaped portion adapted to engage the corresponding portion of a counterpart coupling by a relatively lateral movement, and be rigidly locked together by cam levers or latches, one pivoted on each coupling head and bearing against the other counterpart coupling head. Train pipe passages are formed in the coupling heads and are provided with gaskets adapted to abut against corresponding gaskets of the counterpart coupling head when the two are connected together.

While a coupling of the above type will automatically couple with a counterpart coupling when two cars are brought together, it is necessary to manually operate the train pipe valves to charge an empty section of train pipe from a charged section.

By the present invention means are provided by which the train pipe valves are actuated by the locking mechanism of the coupling head whereby the train pipes will be automatically opened when the cars are coupled and will be automatically closed when the cars are uncoupled, the brake pipe valves being only partially opened when the coupling heads come together so as to permit a slow drop of brake pipe pressure in the charged section and thereby prevent an undesired emergency application.

Referring to the drawings, the automatic train pipe coupling head 1 comprises a projecting nose 2 adapted to engage in a recess 3 of a counterpart coupling head. The head 1 is provided with a hooked portion 4 arranged above and below a plane surface 5, the hooked portion of one coupling head being adapted to engage and interlock with a corresponding hook portion of a counterpart coupling head, in the manner fully described in the above mentioned Westinghouse patent.

Mounted in the coupling head 1 and terminating at the plane surface 5 thereof, are two train pipe conduits 8 and 9, the former being connected to the brake pipe 81, while the latter is connected to the train signal pipe 91. If so desired, the conduits 8 and 9 may be formed in a single casting, as shown in Figs. 1, 2, 4, and 14, and the conduit 8 may be made oval in cross section for a portion of its length so as to reduce the width of the opening to the minimum.

As shown in Figs. 1 and 13, the forward or nose end of the conduit 8 is provided with a gasket 6, while the forward or nose end of the conduit 9 is provided with a gasket 7. These gaskets are adapted to engage the corresponding gaskets on a counterpart coupling and make a fluid tight joint when the coupling heads are coupled together.

The coupling head is provided with a pivoted cam or latch lever 10 having a cam surface 11 for engaging the face 12 of a counterpart coupling head.

The lever 10 carries an arm 13 to which a rod 14 is pivotally connected by a pin 15. A member 16 is secured to the outer end of the rod 14, and interposed between said member and a fixed abutment 17 is coil spring 18. A guide pin 19, secured to the coupling head, is adapted to engage in a slot provided in the member 16.

The rear end of the coupling head is formed with an opening 20 which constitutes a guide for the forward end of a stem 21, the end face of the coupling head, around the opening, being extended to provide a flange 22.

The stem 21 has its rear end provided with a ball section 23 adapted to be mounted in a socket (not shown) carried by the car.

Carried by the stem 21 is a sleeve 24 having one end flanged at 25 for abutting the flange 22. The sleeve 24 is formed with diametrically disposed longitudinal slots 26 into which extend the projecting ends of a pin 27 passing transversely through the stem 21.

A coil spring 28 encircles the stem 21 and the sleeve 24, one end of the spring bearing against the flange 25, while the opposite end thereof bears against a collar 29 at the inner end of the stem.

The spring 28 is normally under initial compression which tends to hold the parts in the position shown in Fig. 1, with the pin 27 engaging the extreme ends of the slots 26. However, the spring 28 is adapted to be compressed to permit telescoping of the stem 21 and the coupling head when two cars are coupled together, whereby the forward end of the stem will be disposed further into the coupling head for a purpose to be described.

At the front end, the stem 21 is provided with an extended portion 30 having a longitudinal slot 31 and engaging in said slot is a U-shaped link 32 which is pivotally connected to a lever arm 33 carried by the cam lever 10. As shown in Figs. 1, 11, and 12, the slot 31 may extend for a distance into the main body of the stem 21 to increase the length thereof with respect to the length of the portion 30.

Formed in the brake pipe conduit 8, with its axis perpendicular to the longitudinal axis of said conduit, is a cylindrical valve chamber 35 containing a rotary plug valve for controlling the flow of fluid through the conduit 8.

As shown, the plug valve may comprise a pair of substantially semi-cylindrical segments 36 and 37 which are internally recessed so as to provide a cavity which extends the length of the valve when the segments are assembled in the chamber 35, (see Figs. 17, 18 and 19). Disposed in the valve cavity and interposed between the segments 36 and 37, are expansible coil springs 39 for yieldingly maintaining said segments in contact with the wall of the valve chamber 35.

The bottom of each segment of the plug valve is notched, as at 82, for receiving a correspondingly formed lug 83 on the upper portion or head 84 of a rotatable valve rod 38. The lugs 83 are diametrically disposed on the head 84, as shown in Fig. 16, and provide a key connection between the plug valve segments 36 and 37 and the rod 38, so that when the rod is rotated in the manner to be hereinafter described, the motion will be transmitted to the plug valve segments. As shown clearly in Figs. 2, 4, 15, 16 and 20, the head 84 of the valve rod 38 may be in the form of a disk, having a diameter slightly less than the diameter of the chamber 35.

In order to prevent the escape of fluid through the valve rod opening at the bottom of the chamber 35, the head 84 is supported by a seat 42 which surrounds the valve rod 38.

Mounted in the top of the chamber 35 and bearing against a plate 40 constituting a head or cap for the plug valve, is an expansible coil spring 41 for yieldingly maintaining the segments 36 and 37 in engagement with the head 84 of the valve rod 38, and the head 84 in contact with the seat 42. The seat 42 may comprise a gasket formed from a suitable composition material.

In order to prevent collapsing of the plug valve segments 36 and 37, due to the build up of a higher pressure on the brake pipe side of the valve chamber 35 than is acting on the interior faces of the segments 36 and 37, when the plug valve is positioned so as to cut off communication through the conduit 8, the wall of the segment 37 is perforated, as at 44, so that fluid under pressure from the brake pipe 81 will be admitted to the cavity within the plug valve, thereby balancing the fluid pressures acting on the opposite sides of the segment 37. The fluid can also flow through an opening 45 in the plate 40 to the upper portion of the chamber 35 above the plug valve, and to the bottom of the valve chamber 35 through the spaces between the segments 36 and 37 and the head 84 of the valve rod 38.

The side walls of the segments 36 and 37 are each provided with alined notches which provide a water way or port 43 through the plug valve.

For the purpose of rotating the plug valve, the rod 38 terminates at its lower end in a laterally projecting arm 46 carrying a roller 47 which is disposed in a cam groove or channel 48 formed in the upper surface of a bar 49 slidably mounted in the coupling head 1, as shown in Fig. 4.

The contour of the cam groove 48 is such that when the coupling head is in uncoupled position the water way or port through the valve will be disposed transversely of the opening in the conduit 8, and when the coupling head is being coupled to a counterpart coupling and the relative position of the bar 49 with respect to the coupling head is shifted, in the manner to be described, the arm 46 will be swung in an arc sufficiently to bring the water way or port of the brake plug into position to slightly open the passage through the conduit 8 (see Figs. 6, 21 and 22).

The lower face of the bar 49 has a longitudinal groove 50 formed therein, which groove receives a correspondingly formed rib 51 with which the coupling head is provided. As shown in Fig. 1, the bar 49 is disposed parallel to the stem 21, being offset a suitable distance therefrom.

As shown best in Figs. 3, 6, 11, 21, 22 and 23, one end of the bar 49 is formed with a laterally projecting arm 52 terminating in a raised portion or nose 53. The extremity of the arm 52 abuts the adjacent face of a lug 54 projecting from one side of the portion 30 of the stem 21.

As shown in Figs. 3, 4, 10, 11, 21, 22 and 23, the side of the portion 30 having the lug 54 is notched at 55 for receiving a laterally disposed T-shaped head 56 carried by one end of a latch-operating member 57 disposed in the coupling head between the stem 21 and the bar 49 in parallel relation thereto.

The upper portion of the head 56 is adapted to normally rest on the portion 30, as shown in Figs. 2, 4, 8, 9 and 10, and this head has an eye 58 projecting upwardly therefrom to which eye is connected one end of a coil spring 59 carried by the depending end of the drawbar coupling pin 60 of the car.

Referring to Figs. 2, 5, 8 and 9, the member 57 is formed with an elongated opening 61 for receiving the laterally projecting end 62 of the weighted arm 63 of a latch member 64. The latch member 64 is pivotally mounted at 65 to the coupling head 1, so as to be movable therewith when the position of the coupling head is shifted with respect to the stem 21 when the cars are brought together for coupling up. The latch member 64 has an arm 66 oppositely disposed with relation to the arm 63, and this arm 66 has a laterally projecting finger 67. When the cars are uncoupled, and the coupling head 1 is extended with relation to the stem 21, the finger 67 bears against the lower face of the bar 49 (see Figs. 2 and 4). However, when the cars are coupled and the coupling head 1 is moved rearwardly on the stem 21, the finger 67 of the latch member 64 is disposed in a notch 68 formed along the adjacent side wall of the bar 49 (see Fig. 7). The outer end of the notch 68 terminates in a stop or shoulder 69, the purpose of which will be hereinafter explained.

Projecting from the side of the valve rod 46 in a lateral direction is another arm 71 which is actuated by the rod 72 of a piston 73 mounted in a cylinder 74 carried by the coupling head 1. The piston rod 72 is guided by a boss 75 formed on the inner end of the cylinder 74.

A seat rib 76 is formed on the end face of the boss 75 against which seat a valve 77 on the piston 73 rests when the piston is at the inner end of its stroke.

The piston 73 is retained normally at the outer end of the cylinder by a coil spring 78, one end of which encircles the boss 75, while the opposite end thereof bears against the inner face of the piston.

The chamber 79 in the cylinder 74 on the side of the piston opposite to the spring 78 is connected to the signal pipe conduit 9 by a pipe and passage 80.

In operation, when cars are brought together for coupling up, the projecting nose 2 of one train pipe coupling enters the recess 3 of the counterpart coupling and in this movement, the cam lever 10 is forced rearwardly by the nose 2. The hooked portions 4 of the two couplings become interlocked through the relative lateral and longitudinal movement and the plane faces 5 meet, so that the train pipe openings therein are connected together.

When the train pipe coupling head on each car moves rearwardly on the stem 21, the sleeve 24 will be carried with it, thereby compressing the spring 28 between the flange 25 and the collar 29 which are brought closer together.

When the coupling head 1 and the stem 21 are thus telescoped together, the U-shaped link 32 will be carried rearwardly of the slot 31 and the pressure of spring 18 will force the lever 10 outwardly towards the nose 2 so that the cam face 11 engages the face 12 of the counterpart coupling head and locks the two coupling heads tightly together.

Inasmuch as the coupling heads will be held telescoped on the stems 21 during the time the car couplers are locked together, the loop ends of the links 32 will not engage the outer end of the slots 31. Therefore, the levers 10 will be retained in locked position by the pressure exerted by the springs 18 and these latches will remain in such position as long as the cars remain coupled together, by virtue of the lost motion provided by the slotted connections between the several parts.

As shown in Figs. 1 and 21, the plug valve in the chamber 35 of the conduit 8 will be closed, and when the train pipe openings of the two coupling heads 1 are brought together during the coupling operation, the plug valve in each chamber 35 of the adjoining coupling heads is adapted to be automatically actuated to open communication through the conduit 8 after the joints between the abutting gaskets have been sealed.

When the coupling head 1 moves rearwardly on the stem 21, as has been described, to actuate the cam lever 10, the bar 49 will be prevented from travelling with the coupling head by reason of the interlock provided between the arm 52 thereof and the lug 54. Therefore, the roller 47 on the end of the valve rod 38 will traverse the cam groove 48, and as this groove has an offset portion formed therein, the arm 46 will be swung from the position shown in Fig. 21 to the position shown in Fig. 22, in which position the port 43 of the plug valve will be so disposed with respect to the conduit 8, that a restricted amount of fluid can flow therethrough from the charged section of brake pipe to the uncharged or empty section. In this way the fluid pressure will be gradually built up in the empty brake pipe section, since the rate of flow past the plug valve will be restricted.

During the inward movement of the coupling head, the latch operating member 57 will also remain stationary, but as the latch 64 is mounted on the coupling head 1, it will be carried therewith, the finger 67 of the latch riding along the lower surface of the portion of the bar 49 to the left of the stop 69.

Since the weighted end 63 of the latch is elevated when the finger 67 is positioned to the left of the stop 69, when the coupling head advances in its movement inwardly of the stem 21, the weighted arm 63 of the latch will, when the finger 67 clears the stop 69, descend to the position shown in Fig. 8, and in so doing, the finger 67 is elevated into the notched portion 68 of the bar 49. The latch will remain so positioned while the coupling heads are locked together. However, as will be hereinafter described, the device is so constructed that when the cars are intentionally separated, the coupling heads 1 are automatically uncoupled and the plug valves are closed, but should the coupling heads be unintentionally disconnected, the plug valves will remain open.

When the coupling heads are coupled, the fluid in the charged section of signal pipe 91 will flow through the two adjoining conduits 9 into the uncharged section of signal pipe, and in so doing will also flow through the pipe and passage 80 leading from each signal pipe conduit 9 into the chamber 79 of the cylinder 74, on each coupling head, gradually building up the pressure on the face of the piston 73 opposite to the spring side thereof.

When the pressure of the fluid in chamber 79 increases an amount sufficient to overbalance the pressure exerted by the spring 78, the piston 73 will be forced toward the seat rib 76, thereby moving the piston rod 72 outwardly of the cylinder 74. In this movement of the piston rod 72, the arm 71 of the plug valve will be swung toward the right (see Fig. 23) a distance sufficient to rotate the valve to wide open position in which the water way or port 43 of the plug valve registers with the conduit openings on the opposite side of the chamber 35. The outward movement of the piston rod 72 will be arrested when the valve 77 of the piston 73 engages the seat rib 76 at the right hand end of the cylinder 74, and thereby seals the piston chamber.

As the action of the piston 73 is subsequent to the initial partial opening of the valve caused by the slight rotation of the valve rod 38 as the result of the movement of the roller 47 longitudinally in the cam groove 48, as heretofore described, the pressure of the fluid admitted into the uncharged brake pipe section will have been built up an amount sufficient to prevent an undesired emergency when the valve is opened wide by the pneumatically actuated means.

Inasmuch as the pressure of the fluid in the signal pipe 91 is greater than the force exerted by the spring 78, the piston 73 will remain seated against the seat rib 76 while the coupling heads are interlocked.

When coupled cars are separated, the car couplers are unlocked by lifting the draw bar pins 60 and as the cars separate, the train pipe couplings remain coupled and locked together until the cars have moved apart sufficiently to pull the coupling heads 1 outwardly of the stems 21 until further longitudinal movement is prevented by the pins 27 engaging the ends of the slots 26, as shown in Fig. 1.

This action will also pull the links 32 to the outer end of the slots 31, whereupon the levers 10 will be swung backwardly out of engagement with the faces 12, thereby permitting the automatic unlocking of the coupling heads.

When the coupling heads separate, the fluid under pressure in the train pipes will vent to the atmosphere and in order to prevent the discharge of fluid a dummy coupling may be applied to the coupling head of the train section that it is desired to retain charged, while the other train section can be emptied to relieve the pressure of fluid in the chamber 79 and permit the closing of the brake pipe valve.

When the coupling heads separate, the springs 28 will maintain the parts in the extended position shown in Fig. 1, ready for coupling up.

As shown in Fig. 9, when the draw-bar pin 60 is lifted in order to effect the uncoupling of the cars, the latch operating member 57 will also be elevated with respect to the front end of the stem 21 and the bar 49, the head 56 of the member 57 being guided by the side walls of the notch 55. Since the laterally projecting end 62 of the weighted arm 63 of the latch member 64 rests on the lower portion of the member 57 in the elongated opening 61, the laterally projecting end 62 of the latch member 64 will also be raised. This action causes the latch member 64 to rotate in a counter clockwise direction so that the finger 67 at the opposite end of the latch member 64 is lowered from its position within the notch 68 to a position below the lower face of the bar 49, thereby unlatching the coupling head from the bar 49.

Therefore, when the coupling head 1 moves outwardly from coupled to uncoupled position, the bar 49 and the member 57 will remain stationary and hence the roller 47 will, in traversing outwardly in the cam groove 48, cause the valve rod 38 to rotate to effect the closing of the brake pipe valve simultaneously with the return of the coupling head to its normal uncoupled position, as shown in Fig. 1.

For the purpose of effecting an emergency rate of reduction of the fluid pressure in the brake pipe to cause immediate application of the brakes when the coupling heads are unintentionally uncoupled, the valve in the chamber 35 should not be closed.

Therefore, should the coupling head 1 move outwardly on the stem 21 while the coupling pin 60 is in normal coupled position, the bar 49 will be carried outwardly with the head 1 by reason of the fact that the finger 67 of the latch 64 will be positioned against the shoulder 69.

Hence the roller 47 will remain stationary in the cam groove 48 and accordingly no rotative movement will be imparted to the valve rod 38 when the bar 49 moves outwardly with the coupling head 1, the nose 53 will ride over the end of the member 57 and thereby prevent lifting of the head 56 from the notch 55.

The functional and structural objects above stated are thus seen to be obtained in the construction described. It is to be understood that certain features of the invention are capable of modification and combination in couplings of other types without sacrifice of the attendant advantages.

Having now described my invention, what I claim as new and desire to secure by Letters Patent, is:—

1. The combination with an automatically operable train pipe coupling having a plurality of train pipe passages, one of which is controlled by a valve, of means actuated when the coupling is connected to a counterpart coupling for rotating the valve to partially open the passage, and means actuated by the pressure of fluid in another passage for subsequently rotating the valve to its wide open position.

2. The combination with a train pipe coupling having a head provided with a train pipe passage, a valve rotatably mounted in the passage, means operated by a predetermined movement of the coupling head relative to the car for rotating the valve to partially open the passage, and means for subsequently rotating the valve to fully open the passage.

3. The combination with a train pipe coupling having a head provided with a plurality of train pipe passages, a valve rotatably mounted in one of the passages, means operated by a predetermined movement of the coupling head relative to the car for rotating the valve to partially open the passage, and means actuated by the pressure of fluid in another passage for subsequently rotating the valve to fully open the passage.

In testimony whereof I have hereunto set my hand.

THOMAS H. THOMAS.